United States Patent [19]

Allan et al.

[11] Patent Number: 4,584,005
[45] Date of Patent: Apr. 22, 1986

[54] HIGH EFFICIENCY PARTICULATE AIR FILTER AND METHOD OF FABRICATING SAME

[75] Inventors: Thomas T. Allan; Robert V. Cramer, both of Washington, N.C.

[73] Assignee: Flanders Filters, Inc., Washington, N.C.

[21] Appl. No.: 625,304

[22] Filed: Jun. 27, 1984

[51] Int. Cl.⁴ ............................................. B01D 46/10
[52] U.S. Cl. ........................................ 55/499; 55/500; 55/502; 55/521; 55/DIG. 31; 160/381; 156/304.3; 156/204
[58] Field of Search ................. 55/484, 497, 499, 501, 55/500, 502, 511, 514, 521, DIG. 31; 160/381; 156/204, 304.3

[56] References Cited

U.S. PATENT DOCUMENTS

| | | |
|---|---|---|
| 2,639,769 | 5/1953 | Krantz . |
| 2,709,489 | 5/1955 | Keebler . |
| 2,783,834 | 3/1957 | Brame . |
| 2,869,694 | 1/1959 | Breckheimer . |
| 3,373,546 | 3/1968 | Setnan ................................. 55/501 |
| 3,534,490 | 10/1970 | Herbert . |
| 3,659,719 | 5/1972 | Westlin et al. . |
| 3,698,114 | 10/1972 | Hirsch et al. . |
| 3,757,499 | 9/1973 | Scott ................................... 55/500 |
| 4,115,082 | 9/1978 | Newell . |
| 4,124,362 | 11/1978 | Westlin et al. . |
| 4,272,953 | 10/1980 | Wasielewski et al. ............ 55/497 |
| 4,323,379 | 4/1982 | Shearin . |

FOREIGN PATENT DOCUMENTS 1951184 4/1971 Fed. Rep. of Germany ........ 55/500

OTHER PUBLICATIONS

European Patent Application 0096597 published 12/21/83.

Primary Examiner—Bernard Nozick
Attorney, Agent, or Firm—Bell, Seltzer, Park & Gibson

[57] ABSTRACT

A high efficiency particulate air filter is disclosed which comprises a frame surrounding and sealably supporting the filter pack, with the frame composed of four separate side panels which are rigidly interconnected at their abutting ends by means of corner plates. The corner plates are in the form of two flanges disposed at right angles to each other, and the flanges are closely received within slots formed on the outer face of the side panels. The corner plates preferably extend across the entire width of the side panels of the frame to impart substantial rigidity to the frame, and a sealing material is disposed in a recess which extends along the bight of the corner plates to provide a continuous seal along the abutting ends of the side panels.

23 Claims, 22 Drawing Figures

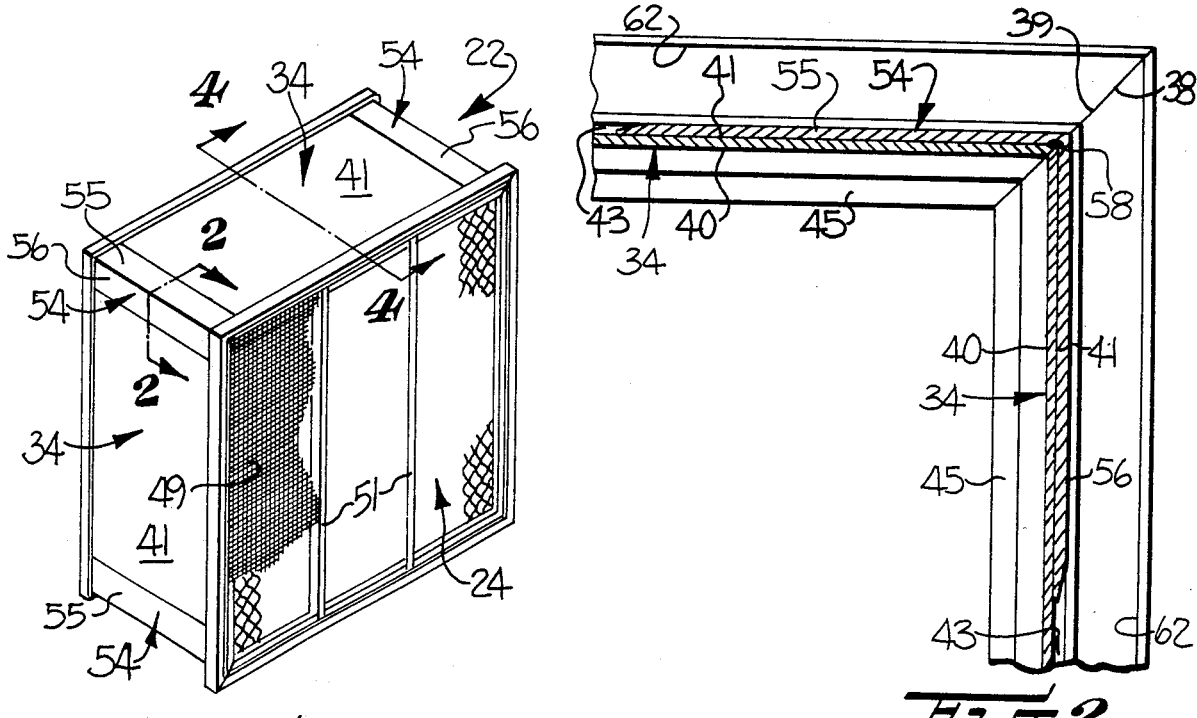
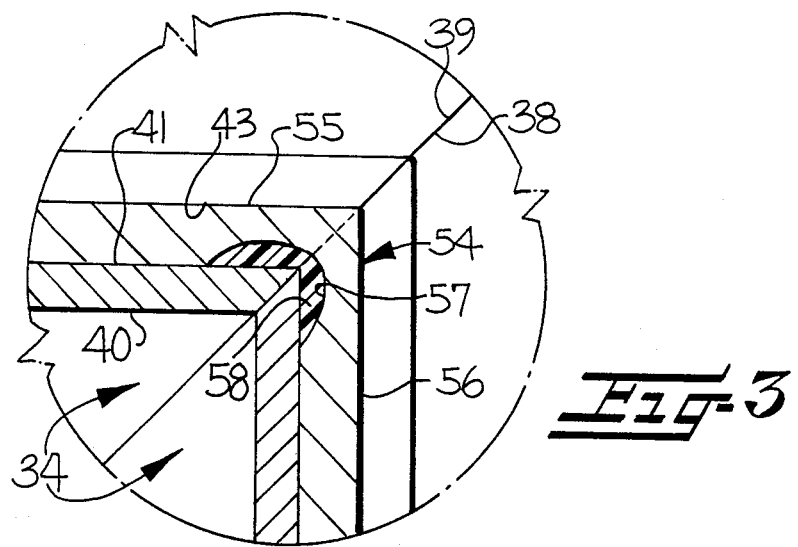
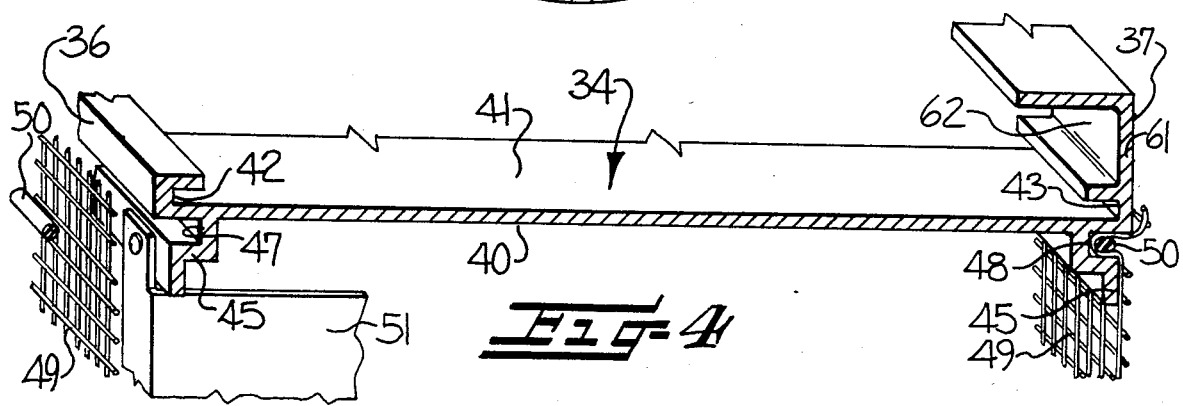

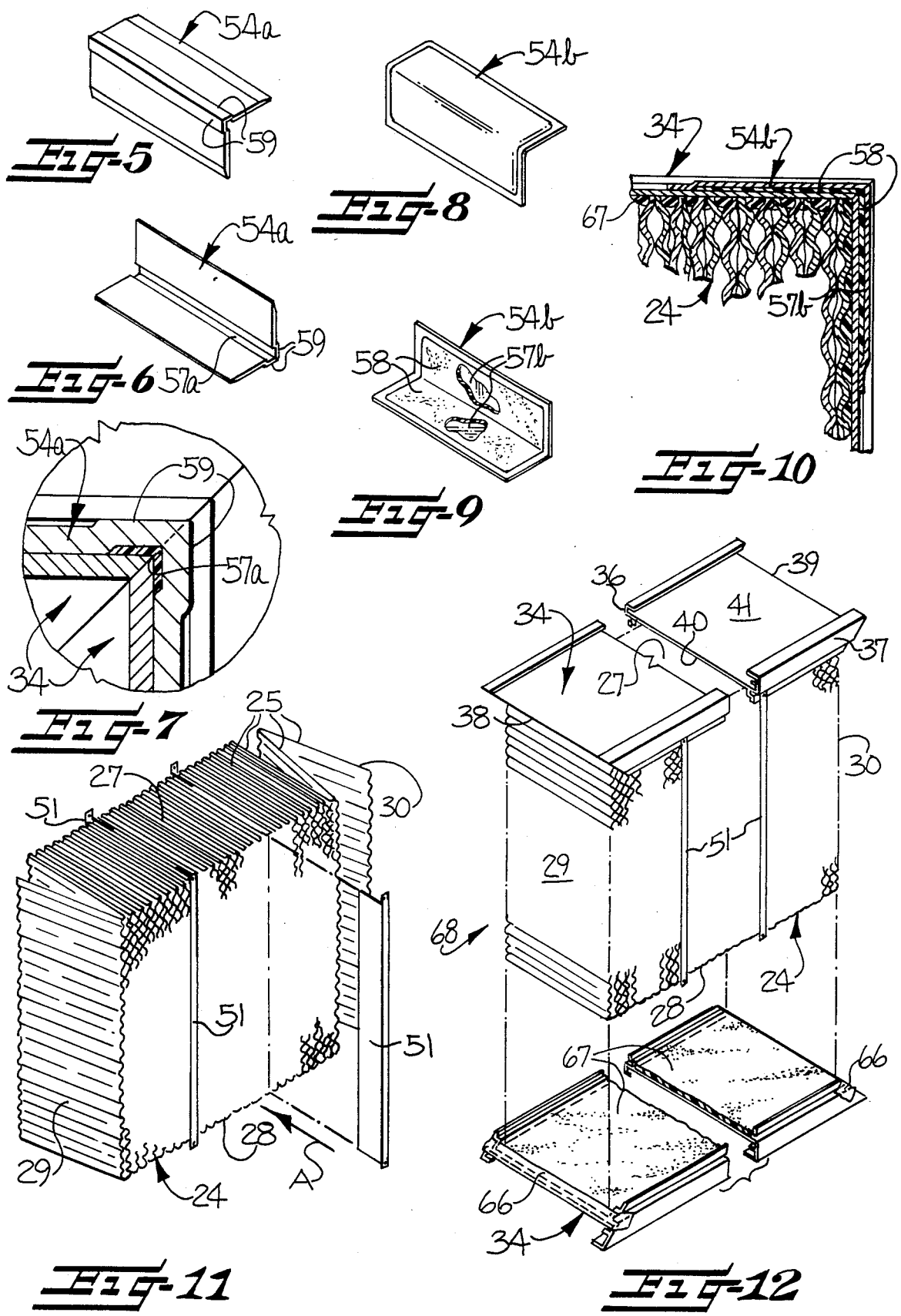

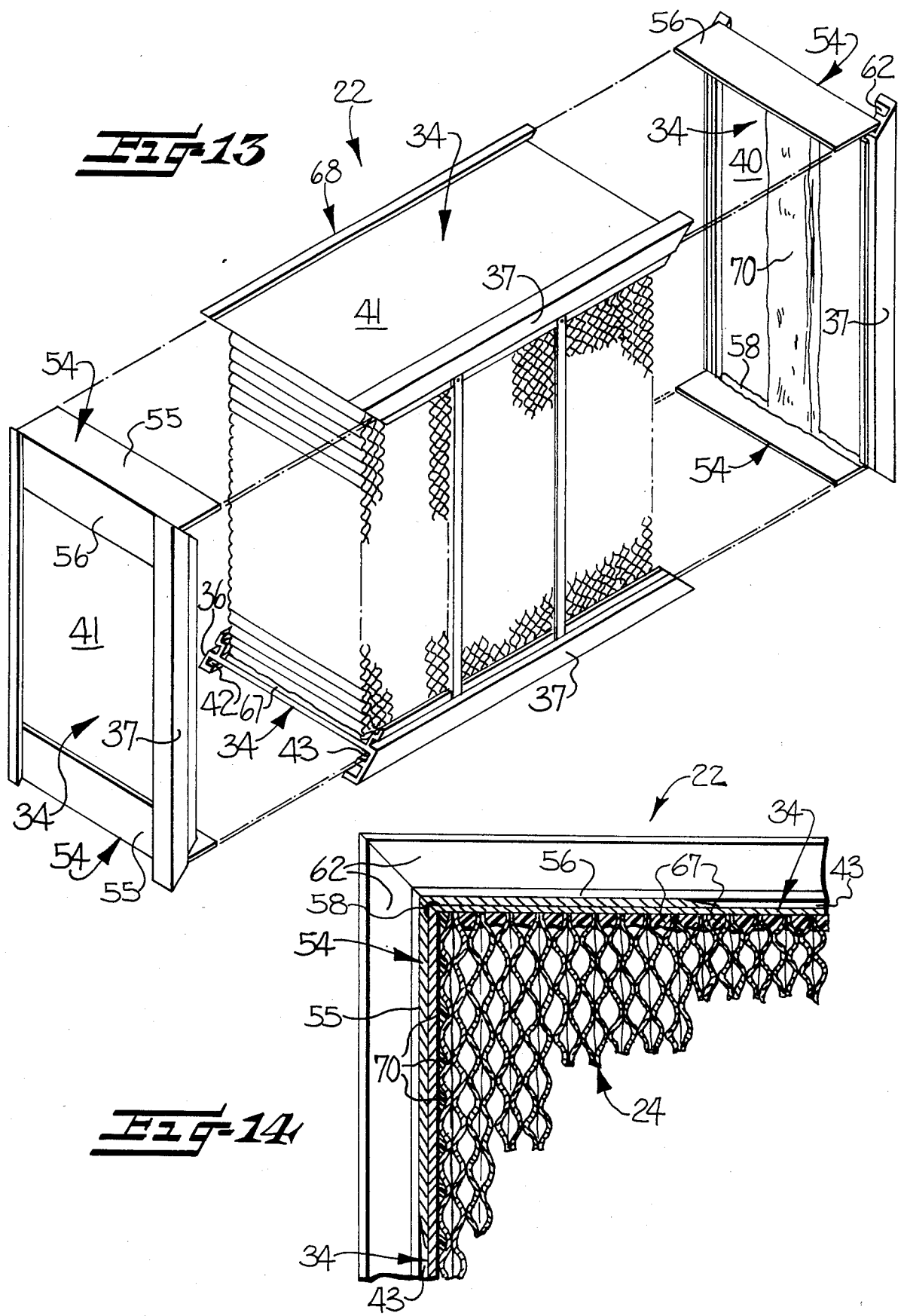

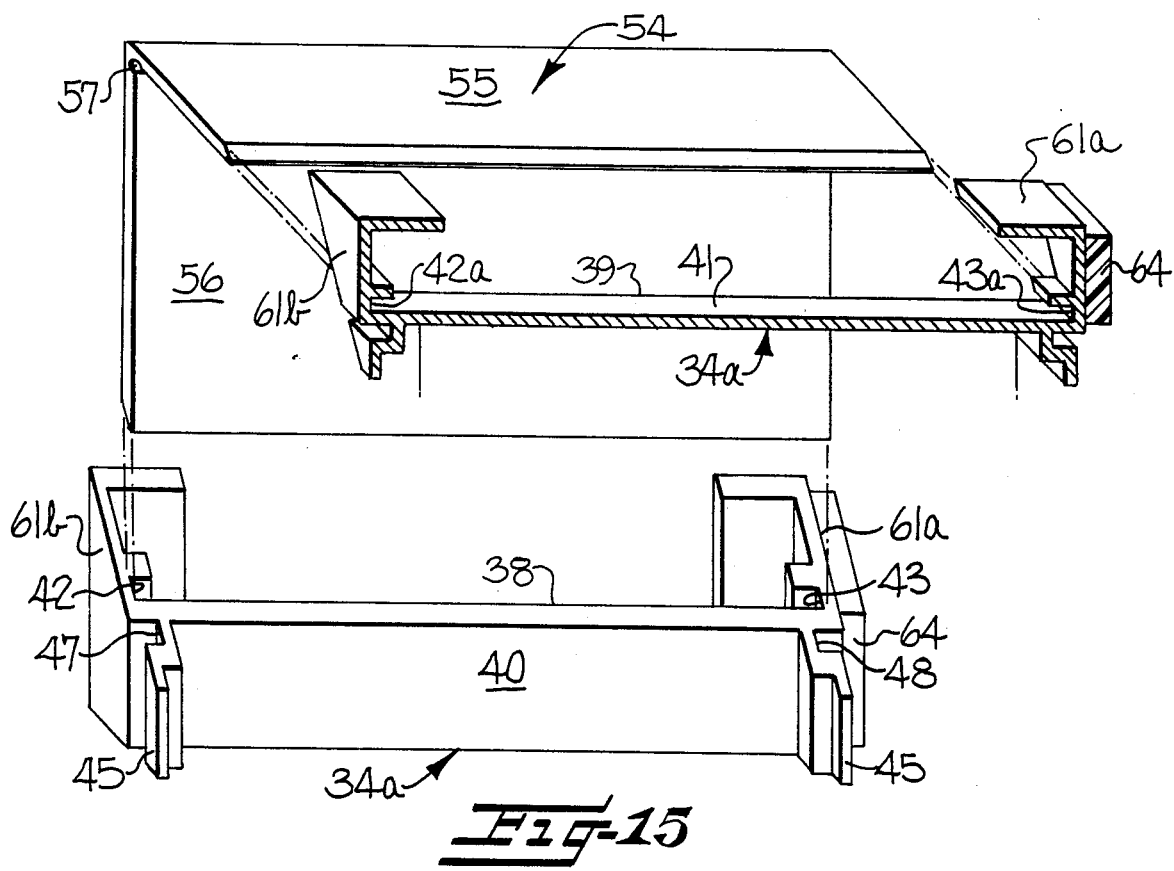
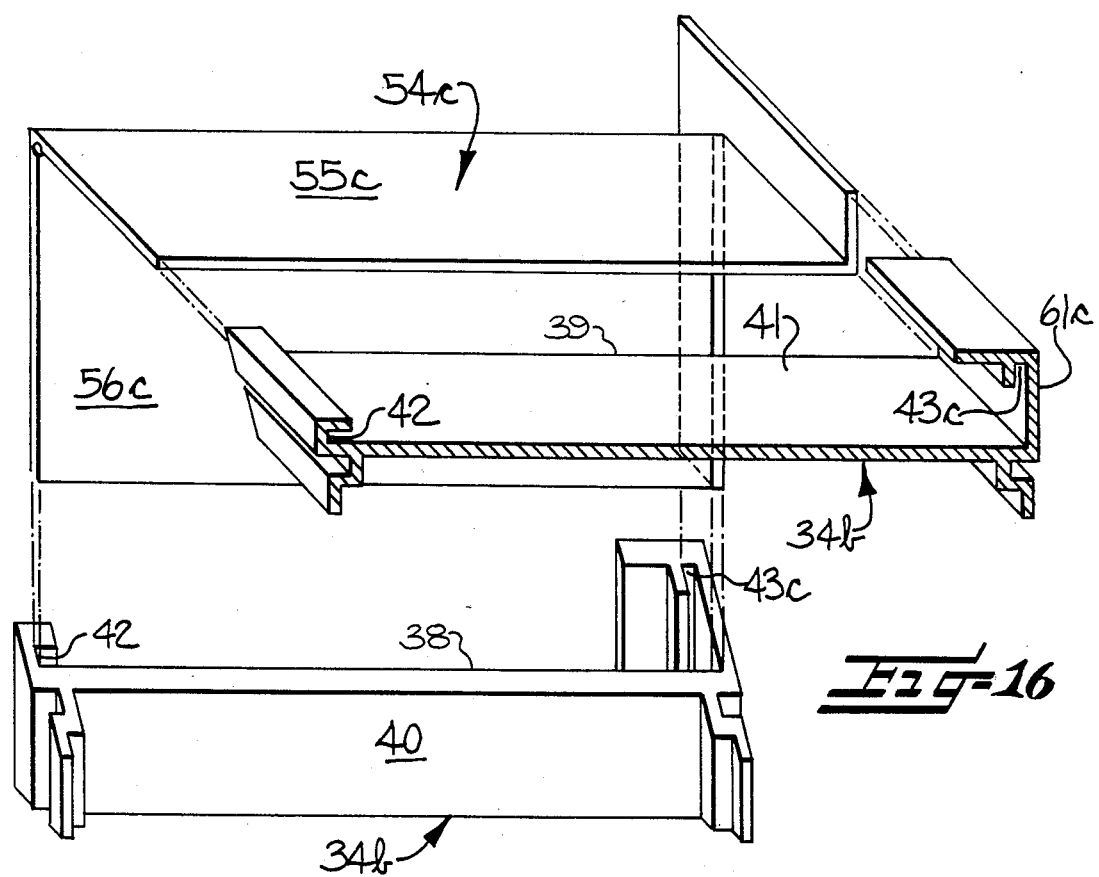

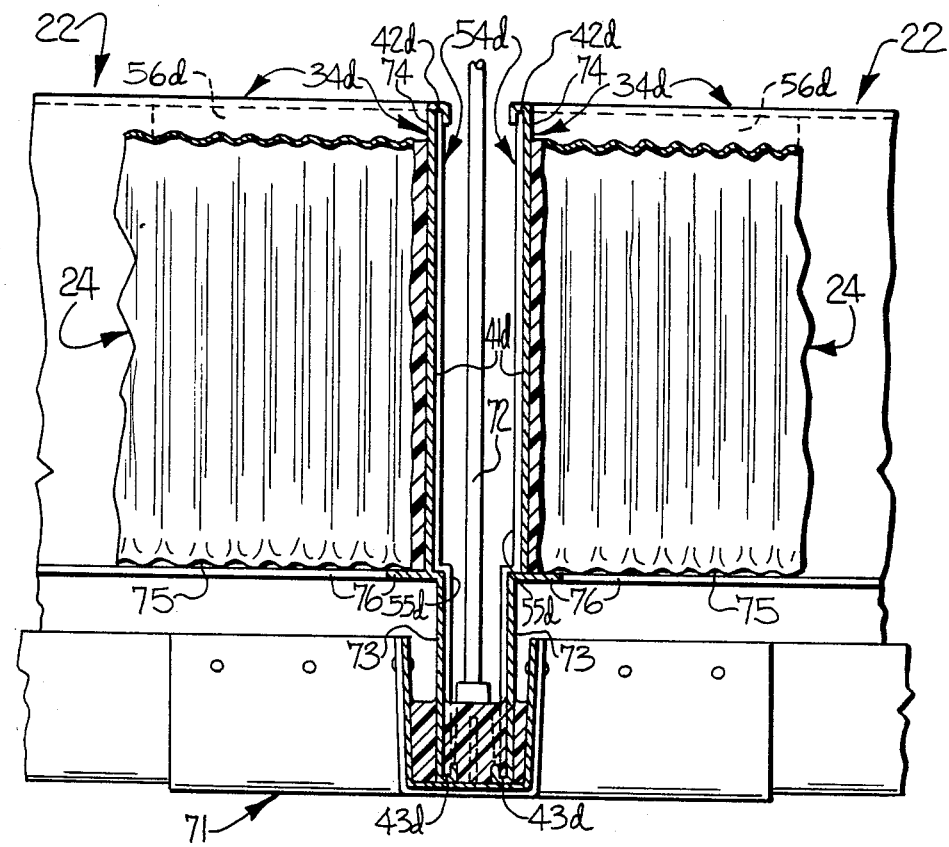
FIG-17
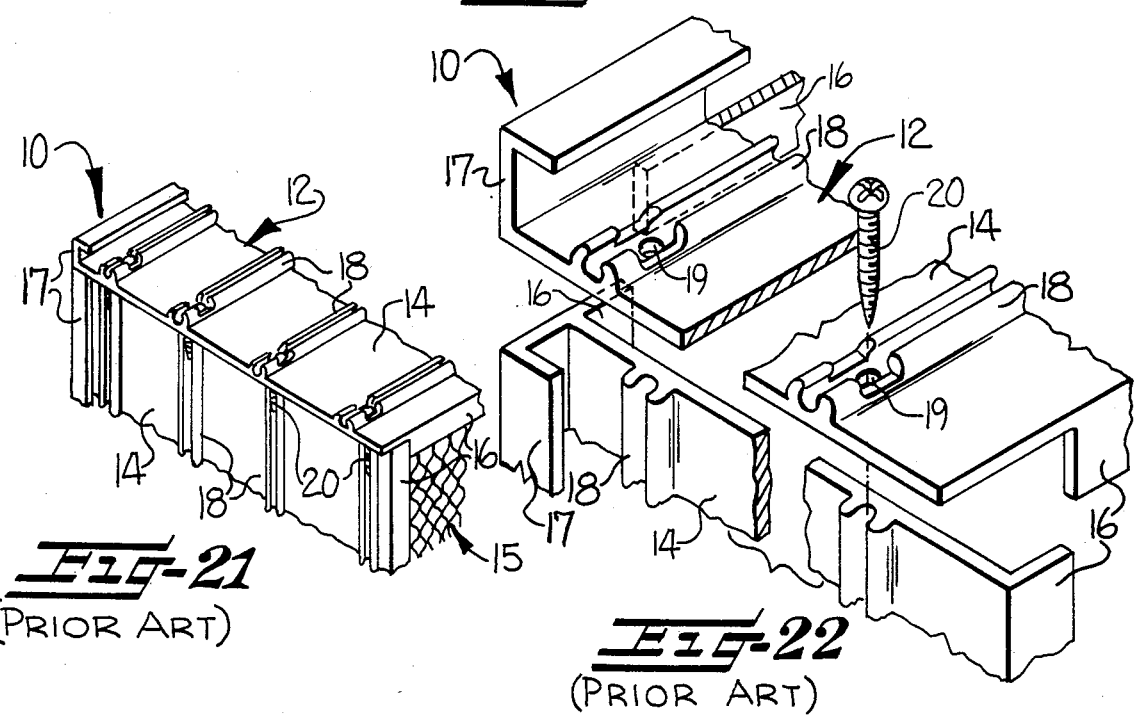
FIG-21 (PRIOR ART)
FIG-22 (PRIOR ART)

HIGH EFFICIENCY PARTICULATE AIR FILTER AND METHOD OF FABRICATING SAME

The present invention relates to a high efficiency particulate air filter of the type presently used to supply virtually particle free air to sensitive laboratory or production areas, and also for the removal and containment of hazardous materials, such as potentially radioactive or biologically hazardous materials, from contaminated air before it is exhausted to the atmosphere. Filters of this type are commonly referred to as high efficiency particulate air or "absolute" filters in the industry, and they typically have the ability to remove a minimum of 99.97% of the particles having a size of 0.3 microns or greater.

Filters of the type comprise a sheet of high efficiency particulate air filtering medium folded upon itself in accordion fashion to form a generally rectangular filter pack which comprises two opposite side edges defined by the edges of the folded sheet, and two opposite end edges defined by the ends of the sheet. A peripheral frame of metal, plastic, or wood surrounds and supports the side edges and end edges of the filter pack, with the frame comprising four separate side panels which are interconnected in an end-to-end, rectangular arrangement.

As will be apparent, it is highly important that an airtight seal be provided between the periphery of the filter pack and the frame. To provide such seal, it is conventional to "build" the frame about the filter pack by a procedure wherein a first side panel is disposed on a horizontal surface with the inside face thereof facing upwardly. A self-hardening liquid sealant is then deposited upon the inner face of the side panel, and one of the side edges of the pack is positioned upon the side panel so as to be immersed in the sealant. Upon hardening of the sealant, the process is repeated for the opposite side edge of the pack. A line of the sealant is then positioned along the inside face of the other two side panels, and these two side panels are then placed over respective ones of the end edges of the pack. The adjacent end edges of the side panels are then securely interconnected, by means of nails or screws.

In the case of filters having metal or plastic frames, it is common for the frame side panels to be extruded with reinforcing flanges along one or both side edges. To join such side edges in an abutting, end-to-end arrangement, the flanges initially must be notched at one end to permit abutting contact with the end of the adjacent panel, and a number of holes are drilled in one end for receiving threaded members. During the assembly procedure, the abutting ends are interconnected by threaded members which are inserted through the holes so as to engage mating channels which are integrally formed in the outer face of the panels.

As will be apparent, the assembly process for such filters is a messy and labor-intensive procedure, with many opportunities to damage the fragile filtering medium. Also, the threaded interconnection is unable to securely hold the frame in square, and it is difficult to provide an adequate seal along the joint between the abutting ends of the adjacent side panels of the frame, and leakage through the abutting ends is a common problem.

It is accordingly an object of the present invention to provide a high efficiency particulate air filter, and method of fabricating the same, which avoids the above-noted disadvantages and deficiencies of the prior art.

It is a more particular object of the present invention to provide a high efficiency particulate air filter having a frame which is composed of interconnected side panels, and wherein the corner connections rigidly support the frame in square, and wherein the abutting edges of the side panels are effectively sealed to prevent the leakage of air therebetween.

It is also an object of the present invention to provide a method of fabricating a high efficiency particulate air filter of the described type and wherein the number of manual operations are significantly reduced, and which minimizes the opportunity for damage to the filter pack medium.

These and other objects and advantages of the present invention are achieved in the embodiments illustrated herein by the provision of a high efficiency particulate air filter which comprises a sheet of filtering medium folded upon itself in accordion fashion to form a generally rectangular filter pack, and a peripheral frame surrounding and supporting the pack. The frame comprises four separate side panels, and each of the side panels includes opposite side edges extending in the lengthwise direction, opposite end edges, inner and outer faces, and at least one pair of channel forming means overlying the outer face of the panel and extending in the lengthwise direction and cooperating with the outer face of the panel to define a lengthwise extending slot therebetween. The slot of each side panel communicates in right angled relationship with the slots of the adjacent side panels, and there is further provided at least one corner plate interconnecting each of the adjacent end edges of the adjacent side panels. Each corner plate comprises a pair of flanges disposed at right angles to each other so as to define a bight at the intersection of the flanges, and preferably a recess is formed in the corner plate along the entire length of the bight, and the recess has a sealing material therein. The flanges are closely received within respective slots of the side panels to interlock the corners, and such that the sealing material serves to seal the adjacent end edges of the side panels.

In one preferred embodiment, one pair of channel forming means is disposed on each side panel, with the channel forming means being disposed along respective side edges of the panel, and with the channel forming means opening toward each other such that the outer face of the panel forms a side wall of the slot defined between the channel forming means. Also, the associated flange of the corner plate is in contiguous, overlying relationship with respect to the outer flange across the entire width of the slot, and thus across substantially the entire width of the side panels.

The above described air filter is fabricated by a method which includes the steps of initially folding a sheet of filtering medium upon itself to form the generally rectangular filter pack which is composed of opposite side edges defined by the edges of the folded sheet and opposite end edges defined by the ends of the sheet. A first pair of frame side panels is provided for overlying and covering each of the two side edges of the pack, and a second pair of frame side panels is provided with the sized to overlie and cover each of the two end edges of the pack.

The first pair of side panels are sealably bonded to respective ones of the side edges of the pack, by a procedure which includes positioning one such side panel on a horizontal surface with the inner face facing upwardly, depositing a thin layer of self-hardening liquid sealing material upon the inner face, and then positioning one of the side edges of the pack upon the inner face of the side panel so as to be immersed in the sealing material. Upon the sealing material at least partially hardening, the above steps are repeated for sealably bonding another one of the side panels to the other side edge of the pack, to thereby form a subassembly composed of the filter pack and the two side panels joined to the two opposite side edges of the pack.

Four corner plates as described above are also provided, and the recess of each corner plate is preferably filled with a sealing material. A pair of corner plates are then assembled with each of the second pair of side panels, by inserting a flange of each corner plate into an associated slot. Sealing material is then deposited along the entire length of either each of the end edges of the filter pack, or the inside face of each of the second pair of side panels, and as a final assembling step, each of the second pair of side panels is assembled to the subassembly by positioning each of the second pair of side panels over an end edge of the filter pack, aligning the flanges of the corner plates with the associated slots in the side panels of the first pair, and then inserting the flanges into such aligned slots to bring the adjacent end edges of the adjacent side panels into engagement.

Some of the objects and advantages of the present invention having been stated, other objects and advantages will become apparent as the description proceeds, when taken in conjunction with the accompanying drawings, in which FIG. 1 is a perspective view of a high efficiency particulate air filter embodying the features of the present invention;

FIG. 2 is an enlarged fragmentary sectional view of a corner of the frame of the filter and taken substantially along the line 2—2 of FIG. 1;

FIG. 3 is an enlargement of a portion of the corner of the frame illustrated in FIG. 2;

FIG. 4 is a fragmentary sectioned and partly exploded view of the frame of the filter shown in FIG. 1 and taken substantially along the line 4—4 thereof;

FIGS. 5 and 6 are perspective views of an alternate embodiment of the corner plate utilized in the frame of the filter shown in FIG. 1;

FIG. 7 is an enlarged cross-sectional view similar to FIG. 3, but illustrating the alternate corner plate as shown in FIGS. 5 and 6;

FIGS. 8 and 9 are perspective views of a further embodiment of the corner plate;

FIG. 10 is a fragmentary end elevation view of the corner portion of a filter embodying the present invention and which includes the corner plate of FIGS. 8 and 9.

FIGS. 11-13 illustrate the steps of the method of fabricating the filter shown in FIG. 1 and in accordance with the present invention;

FIG. 14 is a fragmentary end elevation view of the filter of the present invention and illustrating the manner in which the end edges and side edges of the filter pack are sealed to the frame;

FIGS. 15 and 16 are fragmentary exploded and partly sectioned views of alternative configurations for the frame side panels of the present invention;

FIG. 17 is a fragmentary sectional view illustrating a filter bank composed of a plurality of filters constructed in accordance with the present invention, and with the filter bank being sealably supported on a suspended gridwork of upwardly facing fluid filled channels;

FIGS. 21 and 22 are fragmentary perspective views illustrating a filter frame of the prior art, and the method by which the side panels of the frame are interconnected.

Figure 20:
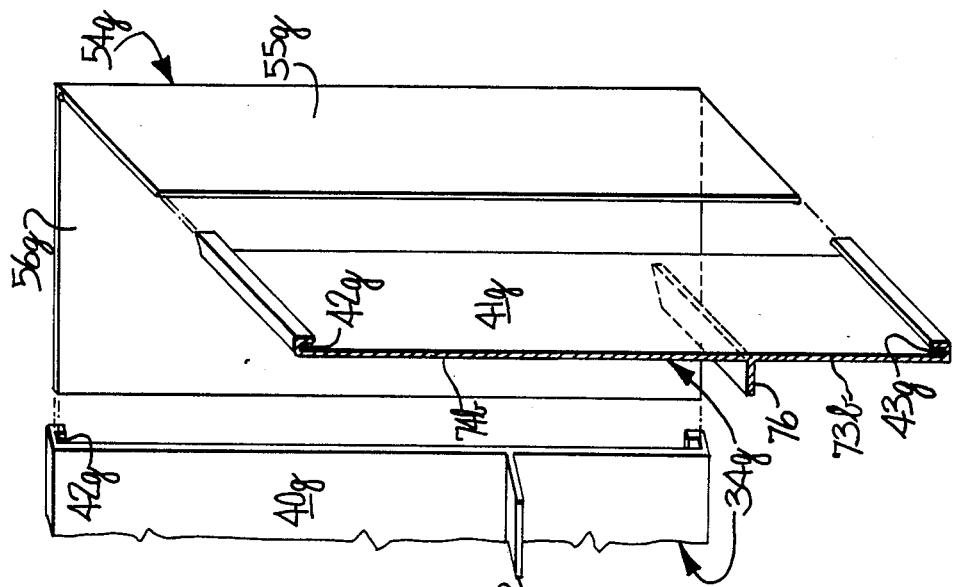
FIGS. 19 and 20 are similar to FIG. 18, and illustrate further embodiments of the frame for filters of the type shown in FIG. 17.

Referring more particularly to the drawings, reference will initially be made to FIGS. 21 and 22 which illustrate a filter 10 having a frame 12 constructed in accordance with the prior art, and the method of interconnecting the side panels 14 of such frame. As illustrated, the filter 10 includes a generally rectangular filter pack which is indicated generally at 15, and the surrounding frame 12 comprises four side panels 14 which are typically fabricated from an extruded metal or plastic material. In the illustrated embodiment of the prior art, the side panels 14 each include an upwardly extending flange 16 along each side edge, and an outwardly extending right angled extension 17 along one side edge, with the extension 17 usually mounting a sealing gasket (not shown) on the outer face thereof. Also, a total of four U-shaped channels 18 are integrally formed on the outer face of the side panels 14.

To build the frame 12 of FIGS. 21 and 22 about the filter pack 15, it is first necessary to notch the two flanges 16 at one end of each side panel, and to drill holes 19 in the channels 18 at one end of each side panel to accommodate the threaded members 20. Thereafter, the side panels 14 of the frame are assembled about the sides of the filter pack, by the procedure generally described above, and wherein a first side panel is supported horizontally with the inner face facing upwardly. A block of wood or other material is then placed across each end of the side panel to form a wall around the periphery of the side panel which is formed by the two flanges 16 and the blocks of wood. A self-hardening liquid sealing material is then deposited in the enclosure defined by the wall, and upon the material becoming somewhat tacky, the wood blocks are removed so that some of the sealing material flows horizontally across the end area of the panels which includes the holes 19, with some of the material flowing into the holes. One side edge of the filter pack is then positioned upon the side panel so as to be immersed in the sealing material, and upon the hardening of the material, the process is repeated to join the other side edge of the filter pack to its mating frame side panel.

Once the two opposite side edges of the pack 15 are secured to the frame side panels, a bead of the sealing material is applied along the entire length of the inside face of the two other side panels, and these side panels are pressed against the end edges of the filter pack and joined thereto by the threaded members 20 which engage in the channels 18 as seen in FIG. 21. The sealing material which has flowed over the end areas and into the holes 19 in the manner described above, thus serves to seal the abutting end edges of the adjacent frame side panels.

The filter frame construction and filter fabrication method of the present invention are seen to overcome the messy and labor intensive method of the prior art as described above. In addition, the present invention provides a more rigid frame and a more secure and reliable seal between the abutting edges of the adjacent side panels. FIGS. 1-4 and 11-14 disclose one preferred embodiment of a filter 22 in accordance with the present invention, as well as the preferred method of fabricating the same. As illustrated, the filter 22 comprises a sheet of high efficiency particulate air filtering medium folded upon itself in accordion fashion to form a generally rectangular filter pack 24 composed of generally parallel layers 25 (FIG. 11), and with the pack including opposite side edges 27, 28 defined by the edges of the folded sheet, and opposite end edges 29, 30 defined by the ends of the sheet. The pack 24 also defines a widthwise and air flow direction (arrow A) between the front and rear faces of the pack.

A peripheral frame surrounds and supports the filter pack 24, with the frame comprising four separate side panels 34 which are interconnected in an end-to-end, rectangular arrangement so as to overlie and completely cover respective ones of the peripheral edges 27-30 of the filter pack. Each of the separate side panels 34 is of like cross-sectional configuration and may be conveniently extruded from a suitable metal or plastic material. More particularly, each of the side panels 34 includes opposite side edges 36, 37 extending in the lengthwise direction, opposite end edges 38, 39, inner and outer faces 40, 41, respectively, and means defining a pair of channels 42, 43 disposed on the outer face and extending lengthwise along the side edges thereof. As best seen in FIG. 4, the two channels 42, 43 face toward each other in the widthwise direction and are aligned to define a lengthwise extending slot, with the outer face 41 of the side panel coinciding with one side of each of the channels so that the outer face 41 forms a side wall of the slot. In the assembled filter, the slot of each side panel communicates in a right angled relationship with the slots of the adjacent side panels. Also, the ends 38, 39 of the side panels are beveled so as to form a miter joint, note FIG. 2.

Each side panel 34 of the frame further includes an integral extension 45 extending inwardly from the inner face 40 along each side edge, with each extension 45 having a somewhat Z-shaped outline in cross section. The two extensions 45 thereby define an outwardly facing pair of channels 47, 48, which are aligned with the corresponding channels of adjacent side panels to define a continuous peripheral mounting channel adjacent each end face of the filter pack. The mounting channels are adapted to receive the peripheral edge of a scrim fabric face guard 49 which protectively overlies the adjacent face of the filter pack, with the peripheral edge being retained in the mounting channel by a resilient strip 50 which is wedged in the channel as seen in the right hand side of FIG. 4. In addition, the filter may further include one or more dividers 51 which are attached to the extensions 45 of the completed filter by rivets or the like, with the dividers extending transversely across the filter and between the layers 25 of filtering medium to maintain the alignment thereof, note FIGS. 11-13.

The filter 22 of the present invention further comprises a corner plate 54 interconnecting each of the adjacent end edges 38, 39 of adjacent side panels, with each of the corner plates 54 comprising a pair of flanges 55, 56 disposed at right angles to each other in cross section. In the assembled filter, the flanges are closely received within respective ones of the slots of the associated side panels and in contiguous, overlying relationship with respect to the outer face 41 of the associated side panel. Further, each corner plate 54 extends along substantially the entire width of the frame at a corner thereof.

As best seen in FIG. 3, a recess 57 is formed at the bight of the flanges 55, 56, and extends along the entire length of the bight. The recess 57 is filled with a sealing material 58 such as conventional silicon caulking compound, and such that the sealing material serves to seal the adjacent end edges of the adjacent side panels.

As will be apparent from FIGS. 2 and 3, the flanges 55, 56 of the corner plates 54 each have a thickness which closely corresponds to the transverse dimension of the channels 42, 43 so as to be tightly receives therein. In addition, it will be seen that the forward edges of each of the flanges 55, 56 of each corner plate are tapered in cross section so as to facilitate their initial insertion into the channels of the associated slot, in the manner further described below.

In the embodment of FIGS. 1-4, each side panel 34 of the frame further includes an integral right angled extension 61 which extends outwardly from the outer face along one side edge of the panel. More particularly, the right angled extension 61 extends outwardly from the bottom wall of the channel 43. The right angled extension thus forms with the outer face 41 of the panel a relatively large U-shaped channel 62, and this channel 62 is adapted to be filled with a sealing fluid of high consistency for sealably mating with a conforming flange of the filter housing, in the manner further described in U.S. Pat. No. Re. 27, 701 to Allan et al.

In the embodiment illustrated in FIGS. 5-7, the bight portion of the corner plate 54a is offset rearwardly, so as to form the recess 57a for the sealing material along the bight, while also forming a widthwise extending rib 59 on each of the outer faces thereof, and so that the end portions of the rib 59 are wedged within the associated channels 42, 43 to thereby resist the removal of the flanges from the slot.

FIGS. 8-10 illustrate another embodiment of the corner plate at 54b, and wherein the recess 57b is in the form of a rather broad depression which extends along the medial portion of the length of the bight, but which terminates just short of each end of the corner plate. Also, the depression extends in the transverse direction across each flange to a point just short of the free edge of the flange, note FIG. 10. Thus each flange is bounded by a coplanar peripheral edge, which is adapted to be received in the mating channels of the side panels and overlie in a contiguous relationship the outer face 41 of the panel. Also, the recess or depression 57b is filled with a sealing material 58 as described above, and it preferably extends for a distance so as to fully overlie the widthwise dimension of the associated filter pack.

FIG. 15 illustrates a modified embodiment of the side panel at 34a, and wherein an integral right angled extension 61a, 61b is formed along each of the side edges of the panel. A resilient sealing gasket 64 is adapted to be mounted on the outer face of one of these extensions, with the other extension being adapted for engagement by a pressure applying member in the filter housing (not shown) for pressing the frame and thus the gasket against a mating flange, to thereby seal the frame against the mating flange.

FIG. 16 illustrates still another embodiment of the side panel of the present invention at 34b, and wherein a right angled extension 61c is disposed along one side of the side panel, and wherein one of the channels 43c is positioned at the bight of the extension 61c so as to open toward the outer face 41 of the panel. The other channel 42 is positioned along the opposite side edge and opens in the widthwise direction, and thus the slot defined between the channels 42, 43c extends across the outer face 41 of the panel, and along the upstanding leg of the extension 61c, and thus the slot includes a corner at the junction of the outer face and the extension 61c. In addition, the corner plate 54c is configured to conform to the outline of the slot as described above, and each flange 55c, 56c of the corner plate includes a first segment adapted to be received in the channel 42 and extend along the outer face of the side panel, and a second segment adapted to extend along the inside of the extension 61c and be received in the channel 43c.

A method for fabricating the above described filter 22 in accordance with the present invention is illustrated in FIGS. 11-13. As an initial step, the sheet of filtering medium is folded upon itself in accordion fashion to form a generally rectangular filter pack 24 composed of generally parallel layers 25, and with the pack including opposite side edges 27, 28 defined by the edges of the folded sheet and opposite end edges 29, 30 defined by the ends of the sheet. In the illustrated embodiment of the pack, the sheet includes longitudinal corrugations, which serve to maintain the separation of the layers 25 when folded, note U.S. Pat. No. 3,540,079 to Bush for a further description of such corrugated sheet. A first one of the side panels 34 is then positioned upon a horizontal surface with the inner face 40 facing upwardly, and a piece of tape 66 or the like is temporarily positioned across each end edge 38, 39, so that the two tapes and two extensions 45 define a peripheral wall about the inner face of the side panel. The thin layer of a self-hardening liquid sealing material 67, such as conventional silicon caulking material, is then deposited upon the inner face, and one of the side edges 27 or 28 of the pack is then positioned upon the inner face so as to be totally immersed in the sealing material 67. Upon the sealing material at least partially hardening, the tapes 66 are removed, and the process is repeated for the other side panel and other side edge of the pack to form a subassembly 68 as seen in FIG. 13. The side edges 27, 28 of the pack are thus sealably bonded to the two side panels, with the bond overlying the entire interface between the side edges and panels.

As the next step in the assembly method, a pair of corner plates 54 as described above are provided and which include a bead of the sealing material 58 deposited along the full length of the recess 57 formed along the bight. The plates 54 are assembled with each of the remaining pair of side panels 34, by inserting a flange 55 or 56 of each corner plate into an associated slot. In addition, a bead of the sealing material 70 is deposited along the full length of the inside face of each of the second pair of side panels, and the second pair of side panels is then assembled to the subassembly 68 by positioning each of the second pair of side panels over an end edge 29, 30 of the filter pack in the manner schematically shown in FIG. 13. The flanges 55, 56 of the corner plates are aligned with the associated slots in the side panels of the subassembly, and the flanges are then inserted into the aligned slots to bring the adjacent end edges 38, 39 of the adjacent side panels into engagement.

As will be apparent, the sealing material 58 in the recess 57 along the bight of each corner plate forms a continuous seal along the adjacent end edges of the adjacent panels as a necessary result of the assembly operation. The frictional engagement between the flanges 55, 56 of the corner plates and the slots 42, 43 is usually sufficient to maintain the assembly of the side panels without additional interconnection means.

Figure 19:
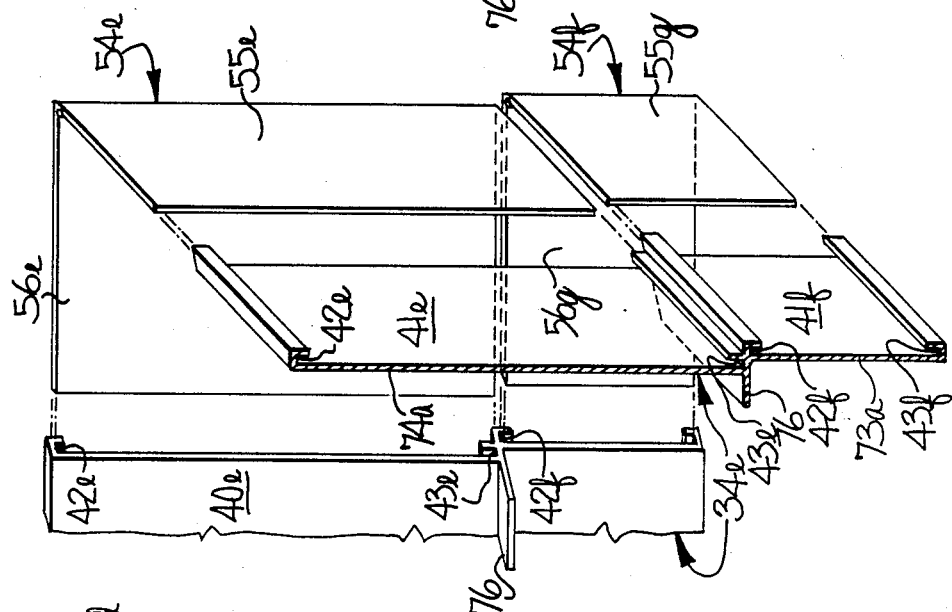
Figure 18:
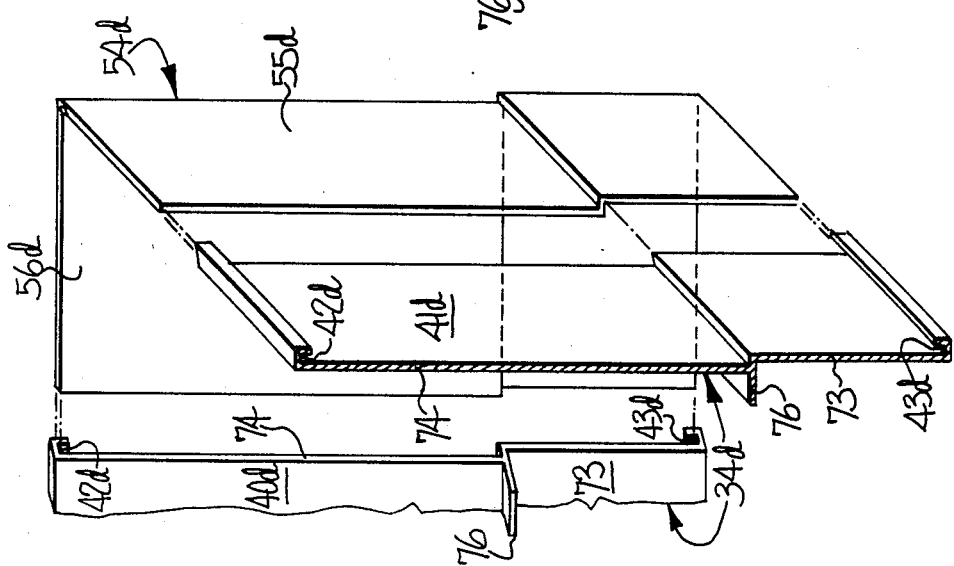
FIG. 18 is a fragmentary exploded and partly sectioned view illustrating one corner of one of the filters shown in FIG. 17.

FIGS. 17-19 relate to further embodiments of the invention wherein each of the side panels of the filter frame includes an integral skirt portion which extends in the widthwise direction a substantial distance beyond the plane of one end face of the filter pack. Such skirt portions of the four side panels are adapted to be sealably received in a fluid filled U-shaped channel framework 71 of rectangular cross-section, which conforms to the cross-sectional outline of the skirt portions of the four side panels and which is suspended by tie rods 72 from a supporting ceiling. A filter bank assembly of this type is further described in U.S. Pat. No. 3,486,311 to Allan.

In the embodiment of FIGS. 17 and 18, the side panel 34d comprises a shirt portion 73 and remaining portion 74, with the skirt portion 73 extending beyond the end face 75 of the filter pack. The skirt portion is offset laterally from the plane of the remainder of the side panel, with the offset being provided to better accommodate the tie rods 72 and to facilitate removal and replacement of the filter downwardly through the supporting framework. Also, an inwardly directed flange 76 is provided at the juncture of the two portions 73 and 74 for supportingly engaging the end face 75 of the filter pack. Further, the channels 42d, 43d of the side panels are disposed along respective side edges of the panel and open generally toward each other but in laterally offset plates. Thus, the outer face 41d of the side panel 34d forms a side wall of the slot defined between the channels 42d, 43d, with the slot having an offset at the juncture between the skirt portion 73 and the remaining portion 74 of the side panel. The flanges 55d, 56d of the corner plate 54d have a corresponding cross-sectional configuration, and are in contiguous overlying relationship with respect to the outer face of the side panel across the entire width of the slot, and thus the entire width of the side panel.

In the embodiment of FIG. 19, the skirt portion 73a is again offset laterally from the plane of the remainder of the side panel 74a, but in this embodiment two pairs of channels are disposed on each side panel, with one pair 42e, 43e being positioned respectively along one side edge of the panel and the juncture of the skirt portion and remaining portion of the side panel, and the other pair of channels 42f, 43f being positioned respectively along the other side edge of the panel and the juncture of the skirt portion and remaining portion of the panel. The channels of each of these pairs open generally toward each other, and such that the outer face of the panel forms a side wall of a slot defined between the channels. In addition, in this embodiment there is provided a pair of corner plates 54e, 54f for interconnecting each of the adjacent end edges of adjacent side panels, with the flanges of each corner plate being received within one of the mating sets of slots of the adjacent side panels.

In the embodiment of FIG. 20, the skirt portion 73b is coplanar with the remaining portion 74b of the side panel, and one pair of channels 42g, 43g is disposed on each side panel, with the channels being positioned along respective side edges of such panel and opening generally toward each other in the same plane. Thus, the outer face of the side panel forms a planar side wall of the slot defined between the channels. In addition, the associated flange of the corner plate 54g is in contiguous, overlying relationship with respect to such outer face across the entire width of the slot, and thus substantially the entire width of the side panel.

In the drawings and specifications, there has been set forth preferred embodiments of the invention, and although specific terms are employed, they are used in a generic and descriptive sense only and not for purposes of limitation.

That which is claimed is:

1. In a high efficiency particulate air filter comprising a sheet of high efficiency particulate air filtering medium folded upon itself in accordion fashion to form a generally rectangular filter pack which comprises front and rear faces defining a widthwise and air flow direction therebetween, and four peripheral sides, and a peripheral frame surrounding and supporting said filter pack, with said frame comprising four separate side panels which are interconnected in an end to end, rectangular arrangement so a to overlie and completely cover respective ones of said peripheral sides of said pack, the improvement wherein each of said separate side panels of said frame includes opposite side edges extending in the lengthwise direction, opposite end edges, inner and outer faces, and at least one pair of channel forming means overlying the outer face of said panel and extending in the lengthwise direction and cooperating with said outer face of said panel to define a lengthwise extending slot between said pair of channel forming means, and with the slot of each side panel communicating in right angled relationship with the slots of the adjacent side panels, and at least one corner plate interconnecting each of the adjacent end edges of adjacent side panels, with each of said corner plates comprising a pair of flanges disposed at right angles to each other in cross section and so as to define a bight at the intersection of the flanges, and a recess formed in each corner plate which extends along substantially the entire length of said bight and continuously along at least the medial portion thereof, with said recess having a sealing material therein, and with the flanges being closely received within respective ones of the slots of the associated side panels to interlock the corners and such that the sealing material serves to seal the adjacent end edges of the adjacent side panels.

2. The high efficiency particulate air filter as defined in claim 1 wherein one pair of channel forming means is disposed on each side panel, with said channel forming means being positioned along respective side edges of each panel, and with the channel forming means opening toward each other such that the outer face of such panel forms a side wall of the slot defined between the channel forming means, and wherein the associated flange of the corner plate is in contiguous, overlying relationship with respect to such outer face across the entire width of the slot and substantially the entire width of the side panels.

3. The high efficiency particulate air filter as defined in claim 1 wherein one pair of channel forming means is disposed on each side panel, and each of said separate side panels includes an upstanding extension which extends outwardly from said outer face and along one side edge thereof, and wherein one of said channel forming means is positioned adjacent the extremity of said extension so as to open toward said outer face, and the other of said channel forming means is positioned along the opposite side edge and so as to open in the widthwise direction, and such that the slot defined between the channel forming means extends across said outer face and said extension and thus includes a corner at the juncture of said outer face and extension, and wherein each flange of each corner plate has a corresponding cross-sectional configuration.

4. The high efficiency particulate air filter as defined in claim 1 wherein each of said side panels includes an integral skirt portion extending in the widthwise direction well beyond the plane of the adjacent face of the filter pack, with said skirt portions of the four side panels being adapted to be sealably received in a fluid filled U-shaped channel framework of rectangular cross-section and which conforms to the cross-sectional outline of the skirt portions of the four side panels.

5. The high efficiency particulate air filter as defined in claim 4 wherein said skirt portion of each side panel is offset laterally from the plane of the remainder of such side panel, and wherein one pair of said channel forming means is disposed on each side panel, with said channel forming means being positioned along respective side edges of such panel and opening generally toward each other but in laterally offset planes, and such that the outer face of such panel forms a side wall of the slot defined between the channel forming means, with the slot having an offset at the juncture between the skirt portion and the remaining portion of the side panel, and wherein each flange of each corner plate has a corresponding cross-sectional configuration and is in contiguous, overlying relationship with respect to the outer face across the entire width of the slot.

6. The high efficiency particulate air filter as defined in claim 4 wherein said skirt portion of each side panel is offset laterally from the plane of the remainder of such side panel, and wherein two paris of said channel forming means are disposed on each side panel, with one pair of channel forming means being positioned respectively along one side edge of said side panel and the juncture of the skirt portion and remaining portion of said side panel, and the other pair of channel forming means being positioned respectively along the other side edge of said side panel and the juncture of the skirt portion and remaining portion of said side panel, with each pair of channel forming means opening generally toward each other and such that the outer face of such panel forms a side wall of the slot defined between each pair of said channel forming means, and wherein a pair of corner plates are provided for interconnecting each of the adjacent end edges of adjacent side panels, with the flanges of each corner plate being received within one of the mating sets of slots of the adjacent side panels.

7. The high efficiency particulate air filter as defined in claim 4 wherein said skirt portion of each side panel is coplanar with the remaining portion of such side panel, and wherein one pair of said channel forming means is disposed on each side panel, with said channel forming means being positioned along respective side edges of such panel and opening generally toward each other and such that the outer face of such side panel forms a side wall of the slot defined between the channel forming means, and wherein the associated flange of the corner plate is in contiguous, overlying relationship with respect to such outer face across the entire width of the slot and thus substantially the entire width of said side panels.

8. In a high efficiency particulate air filter comprising a sheet of high efficiency particulate air filtering medium folded upon itself in accordion fashion to form a generally rectangular filter pack which comprises front and rear faces defining a widthwise and air flow direction therebetween, and four peripheral edges, and a peripheral frame surrounding and supporting said filter pack, with said frame comprising four separate side panels which are interconnected in an end to end, rectangular arrangement so as to overlie and completely cover respective ones of said peripheral edges of said pack, the improvement wherein each of said separate side panels of said frame includes opposite side edges extending in the lengthwise direction, opposite end edges, inner and outer faces, and a pair of channel forming means, overlying said outer face and extending lengthwise along respective ones of the side edges thereof, and with the two channel forming means facing toward each other in the widthwise direction and being aligned to define a lengthwise extending a slot, with the outer face of such side panel coinciding with one side of each of the channel forming means so that the outer face forms a side wall of the slot, and with the slot of each side panel communicating in right angled relationship with the slots of the adjacent side panels, and a corner plate interconnecting each of the adjacent end edges of adjacent side panels, with each of said corner plates comprising a pair of flanges disposed at right angles to each other in cross section and with the flanges being closely received within respective ones of the slots of the associated side panels and in contiguous, overlying relationship with respect to the outer face of the associated side panel, and so that each corner plate extends along substantially the entire width of the frame at a corner thereof.

9. A high efficiency particulate air filter as defined in claim 8 wherein said side panels each comprise a metallic material which has been extruded in the lengthwise direction, and said corner plates each comprise a metallic material which has been extruded in the widthwise direction.

10. A high efficiency particulate air filter as defined in claim 8 wherein each of said side panels further comprises an integral extension extending inwardly from the inner face thereof along at least one side edge, with each such extension defining an outwardly facing channel and with the extensions of the side panels being aligned to define a continuous peripheral mounting channel, and wherein said filter further cmprises a scrim fabric overlying at least one end face of the filter pack and mounted within said continuous peripheral mounting channel.

11. A high efficiency particulate air filter as defined in claim 8 wherein said flanges of each of said corner plates each have a thickness closely corresponding to the transverse dimension of said channel forming means so as to be tightly received therein.

12. A high efficiency particulate air filter as defined in claim 11 wherein said flanges of each of said corner plates each include a widthwise extending rib on the outer face thereof, with the end portions of the rib being wedged within the associated channel forming means so as to resist the removal of the flange from the slot.

13. A high efficiency particulate air filter as defined in claim 8 wherein said flanges of each of said corner plates each include an inner face, with the inner faces intersecting at a widthwise extending bight, and a widthwise extending recess disposed along at least substantially the entire length of said bight, and with said recess having a sealing material therein to preclude air leakage between the mating end edges of the side panels.

14. A high efficiency particulate air filter as defined in claim 13 wherein said end edges of said side panels are beveled so as to form a miter joint between said side panels.

15. A high efficiency particulate air filter as defined in claim 14 wherein the forward edges of each of said flanges of each corner plate are tapered in cross section so as to facilitate their initial insertion into the channel forming means of the associated slot.

16. In a frame adapted to surround and sealably support a generally rectangular filter pack or the like and which comprises four separate side panels which are interconnected in an end to end, rectangular arrangement, the improvement wherein the adjacent end edges of adjacent side panels are effectively sealed along their interface and wherein each of said separate side panels of said frame includes opposite side edges extending in the lengthwise direction, opposite end edges, inner and outer faces, and at least one pair of channel forming means overlying the outer face of said panel and extending in the lengthwise direction and cooperating with said outer face of said panel to define a lengthwise extending slot between said pair of channel forming means, and with the slot of each side panel communicating in right angles relationship with the slots of the adjacent side panels, and at least one conrer plate interconnecting each of the adjacent end edges of adjacent side panels, with each of said corner plates comprising a pair of flanges disposed at right angles to each other in cross section and so as to define a bight at the intersection of the flanges, and a recess formed in such corner plate which extends along substantially the entire length of said bight and continuously along at least the medial portion thereof, with said recess having a sealing material therein, and with the flanges being closely received within respective ones of the slots of the associated side panels to interlock the corners and such that the sealing material serves to seal the adjacent end edges of the adjacent side panels.

17. The frame as defined in claim 16 wherein one pair of channel forming means is disposed on each side panel, with said channel forming means being positioned along respective side edges of such panel, and with the channel forming means opening toward each other such that the outer face of such panel forms a side wall of the slot defined between the channel forming means, and wherein the associated flange of the corner plate is in contiguous, overlying relationship with respect to such outer face across the entire width of the slot and substantially the entire width of the side panels.

18. The frame as defined in claim 17 wherein said end edges of said side panels are beveled so as to form a miter joint between said side panels.

19. A method of fabricating a high efficiency particulate air filter and comprising the steps of folding a sheet of high efficiency particulate air filtering medium upon itself in accordion fashion to form a generally rectangular filter pack composed of generally parallel layers, and with the pack including opposite side edges defined by the edges of the folded sheet and opposite end edges defined by the ends of the sheet, providing a first pair of frame side panels sized to overlie and cover each of the two side edges of the pack, and providing a second pair of frame side panels sized to overlie and cover each of the two end edges of the pack, with all of the frame side panels having a like cross-sectional configuration, and with each side panel including opposite side edges extending in the lengthwise direction, opposite end edges, inner and outer faces, and a pair of channel forming means overlying said outer face and extending lengthwise along respective ones of the side edges thereof to define a lengthwise extending slot therebetween, sealably bonding each of the first pair of side panels to respective ones of the side edges of the pack to form a subassembly thereof, and with the resulting bond overlying the entire interface between the side edges and panels, providing four corner plates, with each corner plate comprising a pair of flanges disposed at right angles to each other, with the flanges being sized to be adapted to be closely received within a slot in one of the side panels, assembling a pair of corner plates with each of the second pair of side panels by inserting a flange of each corner plate into an associated slot, and then assembling each of the second pair of side panels to said subassembly by positioning each of the second pair of side panels over an end edge of the filter pack, aligning the flanges of the corner plates with the associated slots in the side panels of the first pair, and then inserting the flanges into such aligned slots to bring the adjacent end edges of the adjacent side panels into engagement.

20. The method as defined in claim 19 comprising the further step of depositing a sealing material along the entire length of either (1) each of said end edges of said filter pack or (2) the inside face of each of said second pair of side panels, prior to the final assembling step.

21. The method as defined in claim 20 comprising the further step of depositing a sealing material along the full length of the bight of each corner plate prior to the final assembly step, and so that the sealing material forms a continuous seal between the adjacent end edges of the adjacent side panels.

22. The method as defined in claim 20 wherein the step of sealably bonding each of the first pair of side panels to respective ones of the side edges of the filter pack includes positioning one such side panel on a horizontal surface with the inner face facing upwardly, depositing a thin layer of self hardening liquid sealing material upon the entire inner face of such panel, positioning one of the side edges of the pack upon the inner face of the side panel so as to be immersed in the sealing material, permitting the sealing material to at least partially harden, and then repeating the above steps for the other side panel and side edge of the pack.

23. The method as defined in claim 22 wherein the end edges of each of said side panels are beveled so as to form a mitered joint with the adjacent end edge of the adjacent panels.

* * * * *

UNITED STATES PATENT AND TRADEMARK OFFICE
CERTIFICATE OF CORRECTION

PATENT NO.  :   4,584,005

DATED       :   April 22, 1986

INVENTOR(S) :   Thomas T. Allan and Robert V. Cramer

It is certified that error appears in the above-identified patent and that said Letters Patent is hereby corrected as shown below:

Line 17, Column 1, between "the" and "type" insert
      -- above -- .

Line 46, Column 2, "disposed" should be -- positioned -- .

Line 63, Column 2, "with the" should be -- which are -- .

Line 14, Column 6, "receives" should be -- received -- .

Line 59, Column 6, "on" should be -- to -- .

Line 21, Column 9, "a" should be -- as -- .

Line 38, Column 10, "paris" should be -- pairs-- .

Line 23, Column 11, after "extending" delete "a" .

Line 54, Column 11, left out the "o" in "comprises" .

UNITED STATES PATENT AND TRADEMARK OFFICE
CERTIFICATE OF CORRECTION

PATENT NO. : 4,584,005

DATED : April 22, 1986

INVENTOR(S) : Thomas T. Allan and Robert V. Cramer

Page 2 of 2

It is certified that error appears in the above-identified patent and that said Letters Patent is hereby corrected as shown below:

Line 35, Column 12, "angles" should be -- angled -- .

Line 37, Column 12, "conrer" should be -- corner -- .

Signed and Sealed this

Second Day of September 1986

[SEAL]

Attest:

Attesting Officer

DONALD J. QUIGG

Commissioner of Patents and Trademarks